L. GEISLER.
APPARATUS FOR TAKING PHOTOGRAPHS IN COLORS AND CAUSING THEM TO APPEAR STEREOSCOPICALLY.
APPLICATION FILED MAR. 16, 1908.
970,322.
Patented Sept. 13, 1910.
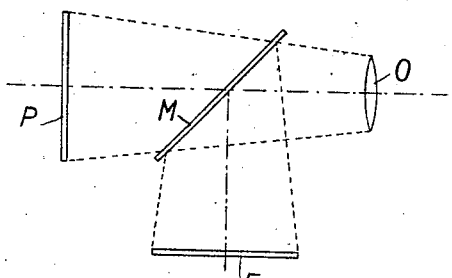
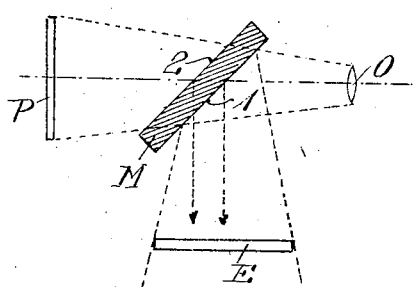
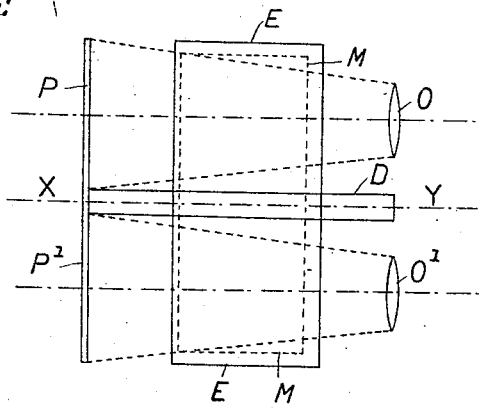
Inventor:-
Louis Geisler

UNITED STATES PATENT OFFICE.

LOUIS GEISLER, OF PARIS, FRANCE, ASSIGNOR TO CHROMOGRAPHY LIMITED, OF LONDON, ENGLAND.

APPARATUS FOR TAKING PHOTOGRAPHS IN COLORS AND CAUSING THEM TO APPEAR STEREOSCOPICALLY.

970,322.   Specification of Letters Patent.   Patented Sept. 13, 1910.

Application filed March 16, 1908. Serial No. 421,505.

*To all whom it may concern:*

Be it known that I, LOUIS GEISLER, a citizen of the Republic of France, residing at 22 Rue de la Faisanderie, Paris, France, have invented certain new and useful Improvements in Apparatus for Taking Photographs in Colors and Causing Them to Appear Stereoscopically; and I do hereby declare the following to be a full, clear, and exact description of the invention, such as will enable others skilled in the art to which it appertains to make and use the same.

This invention relates to a method and apparatus by means of which on the one hand stereoscopic negatives can be taken in colors and on the other hand these negatives made to produce a stereoscopic effect, the colors being obtained by decomposition of the light into four primary colors and by means of black positives. The accompanying drawing furnished by way of example, represents this chromostereographic and chromostereoscopic apparatus in a diagrammatic form.

Figure 1 is a side view of the apparatus, Fig. 2 is a plan thereof. Fig. 3 is a side elevation, partly in section, of this improved apparatus.

The apparatus, like all stereoscopic apparatus, is composed of two exactly similar parts, arranged symmetrically in relation to a plane the section of which lies in X Y. One of these parts is described, the other being separated from the first by the diaphragm D placed in the plane X Y. This diaphragm is intended to limit the luminous cone of the two lenses O and O' so that the plates at P may not be insolated by the lens O' and those at P' by the lens O.

The luminous cone generated by the lens O comes in contact with a mirror screen M placed at an angle of 45°, which reflects a portion of the light and allows the other portion to pass through. The mirror screen M is tinted yellow and throws the light back on to an ultramarine screen E behind which is placed the sensitive plate (horizontal frame) these two plates giving the negative or originals of the yellow and of the ultramarine.

In the part that corresponds to the objective O' the mirror M is tinted green and the corresponding part of the screen E is tinted red.

If the lenses employed for taking the negatives be replaced by lenses suitable for viewing after the apparatus has been turned about and the said negatives have been replaced by their positives, the colored photograph of the objects will be re-constituted, by optical synthesis of the two colors in front of each eye and by physiological synthesis of the two images seen by each of the two eyes; thus stereoscopic reproduction in colors will be effected by means of photography. It is also possible to employ a separate apparatus constructed exactly in the same manner as the chromostereograph, this separate viewing apparatus not having anything particular in it except the viewing lenses. It would also be possible to employ an ultramarine mirror screen on one side and a red mirror-screen on the other, keeping in view that the colors of the screen mirrors placed behind each of the objectives must be complementary each to each of the screens on which they reflect the light, in order to avoid doubles through reflection on the back part of the mirror screen.

Four colors have been mentioned, but it is evident that four others might be taken, provided that they are complementary of one another and divide the cycle of colors into four equal parts. It is obvious, on the other hand, that the constructional details of the apparatus may be varied without changing the nature of the invention.

The red and the green are employed on one side of the apparatus and the yellow and the blue on the other side in accordance with the laws of Newton, relating to the decomposition of white color as well as the principles set forth by Maxwell. In accordance further with the principles of photochemy now universally known and on which Ducos Du Hauron and Cross based the reproduction of colors by the method termed indirect. Two colors would be insufficient for reproducing all the shades and three colors at least are necessary. However, the chromatic circle can be divided into more than three colors provided that the sum of the screens are of the pigmentary colors, which produces a pigment comprising the three colors, to wit, the blue, the red and the yellow in equal quantity. In the stereoscopic apparatus to which this invention relates, four colors have been given because four sensitive plates are required. Moreover, the division of the chromatic circle by four gives two complementary colors to one side whereby doubles are avoided, and plates of equal sensitiveness are used for the colors thus distributed.

In order to make the matter as clear as possible, the thickness of the mirror M Fig. 3 which receives the luminous rays from the objective O is exaggerated. A portion of these rays passes through the mirror M in order to reach the screen P and a portion of them is reflected onto the screen E, the back of the mirror being in front of the dark part. But in this reflection, account must be taken of two reflecting surfaces, the front surface 1 and the back surface 2. Each of the luminous rays is thus reflected twice, producing a double and consequently not a very clear image on the screen E if the mirror M is either not colored at all or colored in any fashion. In this device, the mirror M is colored and this color is always complementary to that of the screen E and moreover is as intense as possible which obviates the necessity of using any colored screen at the back of the apparatus, the mirror screen serving for that purpose. The result of this is that the luminous rays which are reflected on the back surface 2 and have twice passed through the mirror M take the color of this mirror and are consequently absorbed and annihilated through the screen E, the color of which is complementary to that of its rays. Under these conditions, the same effect is produced as if the rays reflected on the back surface 2 did not exist. Doubles are thus impossible in this apparatus and this is what distinguishes it from apparatus in which a colorless reflector is used in combination with a colored screen.

It will be obvious that the result obtained is very important, particularly when panchromatic plates are used or when the sensitive plates are intentionally over-exposed for the purpose of obtaining certain artistic effects.

What I claim and desire to secure by Letters Patent is:—

1. In an apparatus for taking and viewing stereoscopic photographs in colors in which the colors are obtained by decomposition of the light into four primary colors, the combination of an objective, a sensitive plate arranged in the axis of the objective, a mirror inclined at an angle of forty-five degrees to said objective, a side screen arranged in a plane at right angles to and at a point in front of said sensitive plate, a portion of the light being reflected by said mirror screen on the said side screen and another portion passing through to said sensitive plate, said mirror screen having a color complementary to that of the side screen.

2. In an apparatus for taking and viewing stereoscopic photographs in colors, in which the colors are obtained by decomposition of the light into four primary colors, the combination of two objectives, a mirror screen having different colored portions and arranged behind both objectives and inclined at an angle of forty-five degrees thereto, one colored portion of said mirror lying behind one objective and the other colored portion behind the other objective, four sensitive plates, two being arranged in the axes of the objectives and the other two in a plane at right angles thereto, a side screen arranged over two of said sensitive plates and in advance of the other two plates, said mirror screen being arranged to reflect one portion of the light onto said side screen and allow another portion thereof to pass and act on the sensitive plates arranged in the axes of the objectives, said mirror screen acting simultaneously as a screen for selecting rays on the sensitive plates placed in the axes of the objectives and having on each of its halves which correspond to each of the objectives a color complementary to that of the screen which receives the rays reflected by the mirror.

In testimony whereof I affix my signature, in presence of two witnesses.

LOUIS GEISLER.

Witnesses:
OCTAVUS FLINTAINE,
CHARLES FABER.